United States Patent [19]

Schlosser et al.

[11] Patent Number: 5,076,252
[45] Date of Patent: Dec. 31, 1991

[54] BARBECUE GRILL ASSEMBLY

[75] Inventors: Erich J. Schlosser, Barrington; J. Michael Alden, Palatine, both of Ill.

[73] Assignee: Weber-Stephen Products Co., Palatine, Ill.

[21] Appl. No.: 721,196

[22] Filed: Jun. 26, 1991

Related U.S. Application Data

[63] Continuation-in-part of Ser. No. 566,147, Aug. 10, 1990, Pat. No. 5,027,788.

[51] Int. Cl.[5] .......................... A47J 37/00; F24B 3/00
[52] U.S. Cl. .............................. 126/25 R; 126/41 R; 126/276; 220/744
[58] Field of Search .................. 126/25 R, 41 R, 30, 126/25 C, 37 B, 39 B, 276, 37 A, 242, 50; 99/484; 312/236; 220/379, 85 CH, 85 H; 431/343, 344

[56] References Cited

U.S. PATENT DOCUMENTS

| D. 214,220 | 5/1969 | Van Halen | D7/334 |
|---|---|---|---|
| 2,780,474 | 2/1957 | Farah et al. | 126/25 R |
| 3,866,994 | 2/1975 | Bonin | 126/25 R |
| 4,635,613 | 1/1987 | Tucker et al. | 126/41 R |
| 4,677,964 | 7/1987 | Lohmeyer et al. | 126/41 R |
| 4,688,541 | 8/1987 | Stephen et al. | 126/25 R |
| 4,886,045 | 12/1989 | Ducate, Jr. et al. | 126/41 R |
| 5,027,788 | 7/1991 | Schlosser et al. | 126/25 R |

Primary Examiner—James C. Yeung
Attorney, Agent, or Firm—Wallenstein, Wagner & Hattis, Ltd.

[57] ABSTRACT

A portable barbecue grill assembly is disclosed that includes a barbecue kettle (10) having a generally semi-hemispherical bottom bowl (11) and a generally semi-hemispherical removable kettle cover (12). An ash catcher (100) and a cover holder (30) are secured to the bottom bowl (11). A cart (50) is employed for holding the kettle (10) adjacent one end of a fuel tank (72), ignitor assembly (43) and a storage bin (80) with cover (70) adjacent the other end. The cart (50) includes two parallel side support structures (52), each including a horizontal upper side member (53) and a pair of vertical posts (56,57), with the side support structures being connected to each other near their bottoms by a pair of substantially parallel lower transverse cross-members (66) and adjacent their tops by a pair of substantially parallel upper transverse cross members (66a). A pair of lower horizontal side support members (54) connects at each end to one of the lower cross-members (66). And, a storage rack (95) is positioned between the lower cross-members (66) and below the storage bin (80) and fuel tank (72).

20 Claims, 3 Drawing Sheets

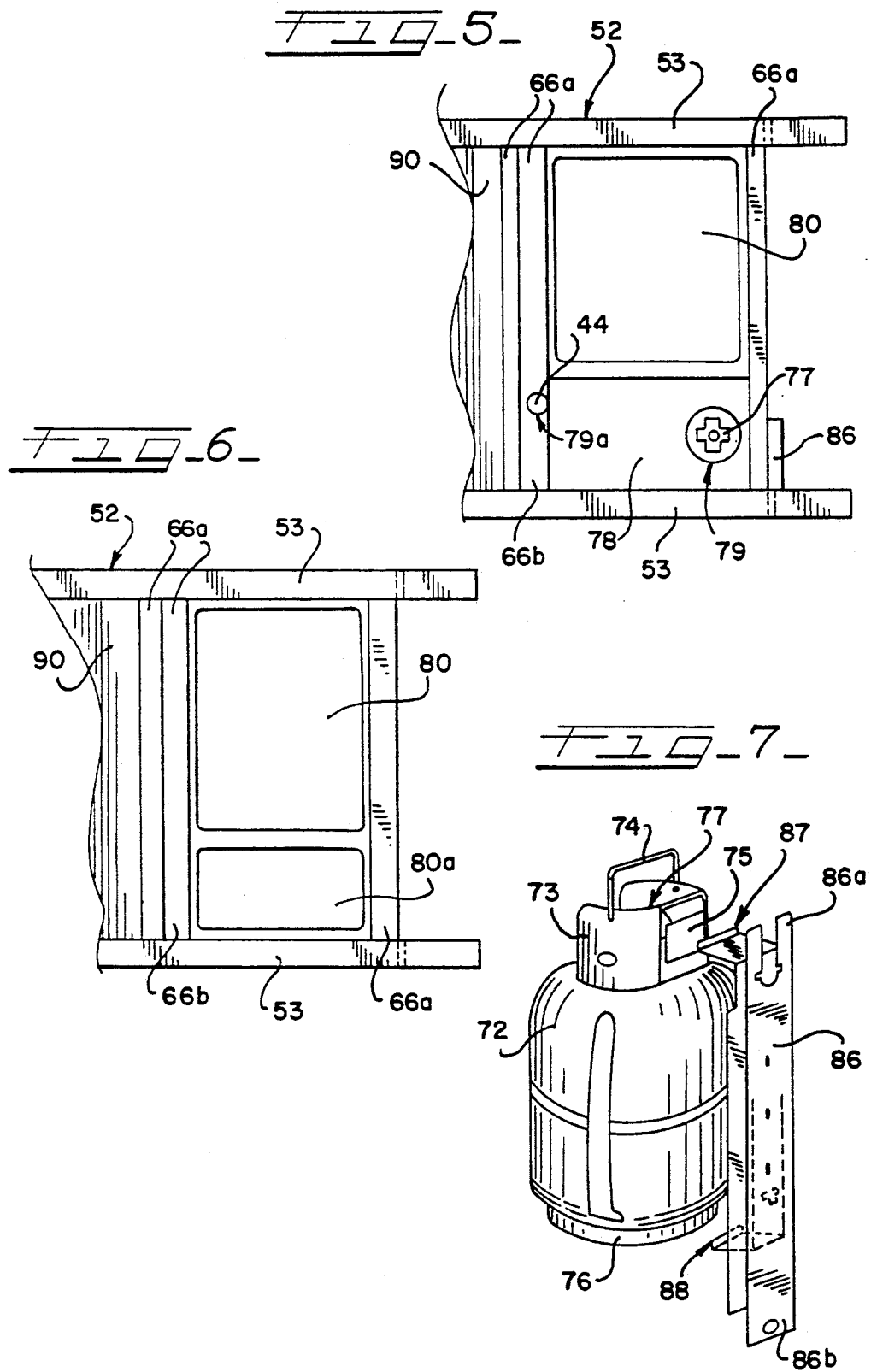

BARBECUE GRILL ASSEMBLY

REFERENCE TO RELATED APPLICATIONS

This is a continuation-in-part application of U.S. Ser. No. 566,147, filed Aug. 10, 1990, issued July 2, 1991 as U.S. Pat. No. 5,027,788.

DESCRIPTION

1. Technical Field

The present invention relates generally to kettle-type barbecue grills and, more particularly, to a barbecue grill assembly that includes an improved cart for supporting the barbecue grill and an optional fuel tank.

2. Background Prior Art

Kettle-type grills are very widely used today. Presently, one of the most popular grills is being marketed by the Assignee of the present invention. This barbecue kettle consists of a generally semi-hemispherical bottom bowl that has a circular open top with a cooking grid slightly below the upper rim of the bowl. A generally semi-hemispherical top cover can be placed on the bottom bowl. Most often, the bowl is supported on a tripod leg arrangement or a center post arrangement. The kettle configuration with and without the tripod arrangement is a registered trademark of the Assignee of the present invention, WEBER-STEPHEN PRODUCTS CO.

Barbecue kettles that are designed for burning charcoal as a fuel can also have a second grid for supporting the charcoal below the cooking surface and above the kettle bowl. Both the bowl and cover have vent openings to provide the necessary oxygen for combustion of the charcoal while the cover is closed.

One type of barbecue kettle that has received very favorable acceptance by consumers is disclosed in U.S. Reissue Pat. No. 33,091, also owned by the Assignee of the present invention, which is sold under the registered trademark ONE-TOUCH ®.

In an effort to provide adequate work area around the grill, various types of carts have been proposed that define the work surface surrounding the kettle and also provide a storage area for essential components normally used in the cooking process.

Moreover, many times it is desirable to have the cover or lid partially shield the cooking surface or grid, such as for outdoor cooking in extremely high windy conditions. Various mechanisms have been proposed for providing a work surface around a circular grill and also for providing shielding devices for shielding the cooking surface. One such mechanism is disclosed in U.S. Pat. No. 4,635,613, owned by the Assignee of the present invention, which shows a novel rectangular cart designed to support a circular gas grill and provides working surfaces on opposite sides of the grill.

Another mechanism is disclosed in U.S. Pat. No. 4,688,541, also owned by the Assignee of the present invention, which shows a work surface attached to the bowl of a kettle. However, Applicants are constantly striving for obtaining a better unit which is attractive in appearance and also is functionally-desirable.

SUMMARY OF THE INVENTION

According to the present invention a portable barbecue grill assembly is disclosed that includes a barbecue kettle that has a generally semi-hemispherical bottom bowl and a generally semi-hemispherical removable kettle cover with an ash catcher and a kettle cover holder secured to the bottom bowl, a storage bin with a bin cover, a fuel tank, a gas ignitor secured to the bottom bowl for igniting the fuel flowing from the fuel tank into the bowl, and an improved cart structure for supporting each of these components at a working and an accessible height. The bottom kettle bowl is supported adjacent one end, and the storage bin, the bin cover, the fuel tank, and the ignition controls are supported adjacent the other end.

The cart structure comprises two parallel side support structures with each including a horizontal upper side member and a pair of vertical posts. The side support structures are connected to each other near their bottoms by a pair of substantially parallel lower transverse cross-members and adjacent their tops by a pair of substantially parallel upper transverse cross-members. There are further a pair of lower horizontal side support members connected at each end to one of the lower transverse cross-members. A storage rack is also positioned between these lower transverse cross-members and below said storage bin.

The bottom bowl of the kettle is secured to the cart by a side bracket fastened to each of horizontal upper side member and to a side of the kettle. The fuel tank is held below the cover, above said storage rack and adjacent the storage bin by a pair of hooks that cooperate with the tank that are attached to an end plate disposed between an upper transverse cross-member and a lower transverse cross-member.

The storage bin disposed between the two upper transverse cross-members is either rested upon or secured to the two upper cross-members. This bin has an inclined bottom surface for aiding in the removal of charcoal and for permitting water to drain out. The bin cover is disposed above the storage bin and is hingedly connected between the horizontal upper side support members so as to be movable between an open position to access the storage bin, ignition switch and the fuel tank valve and a closed position to cover the storage bin and controls. The cover is treated so that it can be used as a work surface. Also, an additional work surface is positioned adjacent the bottom bowl and between the upper horizontal upper side members. A suitable treatment for both the cover and work surface is porcelain-coated enamel.

In a second embodiment of the present invention, in place of the fuel tank and the ignitor system, an additional storage bin for utensils is disposed between the two upper transverse cross-members and adjacent the first storage bin. This second bin also is either rested upon or secured to the two upper cross-members.

Other advantages and aspects of the present invention will become apparent upon reading the following description of the drawings and detailed description of the invention.

BRIEF DESCRIPTION OF DRAWINGS

FIG. 5 is a partial top plan view of the portable grill assembly of FIGS. 1-4 wherein the cover for the storage bin is removed;

FIG. 6 is a partial top plan view of a second embodiment of the portable grill assembly made in accordance with the teachings of the present invention wherein the cover for the storage bins is removed; and, FIG. 7 is a detailed perspective view of the fuel tank and the hooks and the end plate that support it.

DETAILED DESCRIPTION

Figure 1:
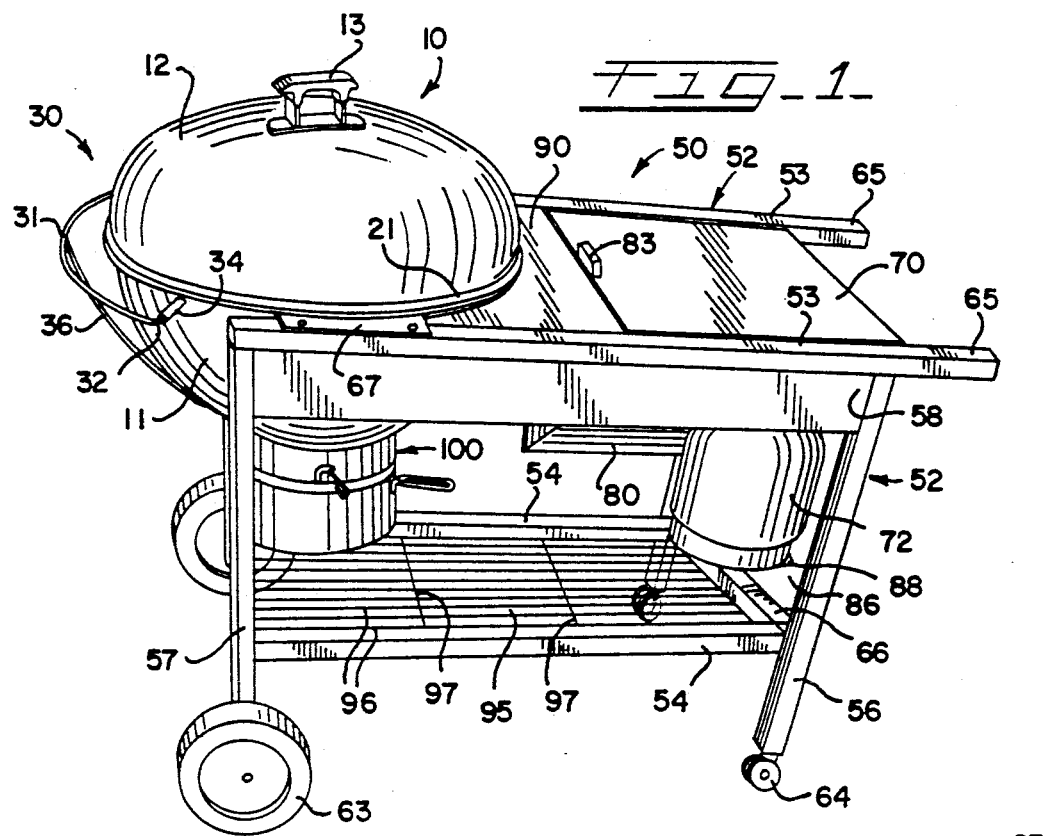
FIG. 1 is a perspective side view of a first embodiment of the portable grill assembly made in accordance with the teachings of the present invention.

While this invention is susceptible of embodiment in many different forms, there is shown in the drawings and will herein be described in detail two preferred embodiments of the invention with the understanding that the present disclosure is to be considered as an exemplification of the principles of the invention and is not intended to limit the broad aspect of the invention to the embodiments illustrated.

FIG. 1 of the drawings shows a kettle-type barbecue grill, generally designated by the reference numeral 10, that is of a well-known configuration and has been sold by the Assignee, WEBER-STEPHEN PRODUCT CO., of the present invention for years. It comprises a generally semi-hemispherical bottom bowl 11 and a generally semi-hemispherical, removable cover 12. The bowl 11 has an upper edge or lip (not shown), while the cover 12 has a sealing rim 21. The rim 21 is dimensioned to fit snugly around the lip so that a substantially airtight seal is developed between the bowl 11 and the cover 12. The bowl and cover are preferably formed from porcelain-coated enamel. A handle 13 is provided at the top of the cover 12. The kettle 10 is generally constructed in accordance with the teachings of U.S. Pat. No. 4,416,248, which is incorporated herein by reference. However, since the kettle 10 is supported by the cart of the present invention, a tripod leg arrangement is not necessary.

Figure 3:
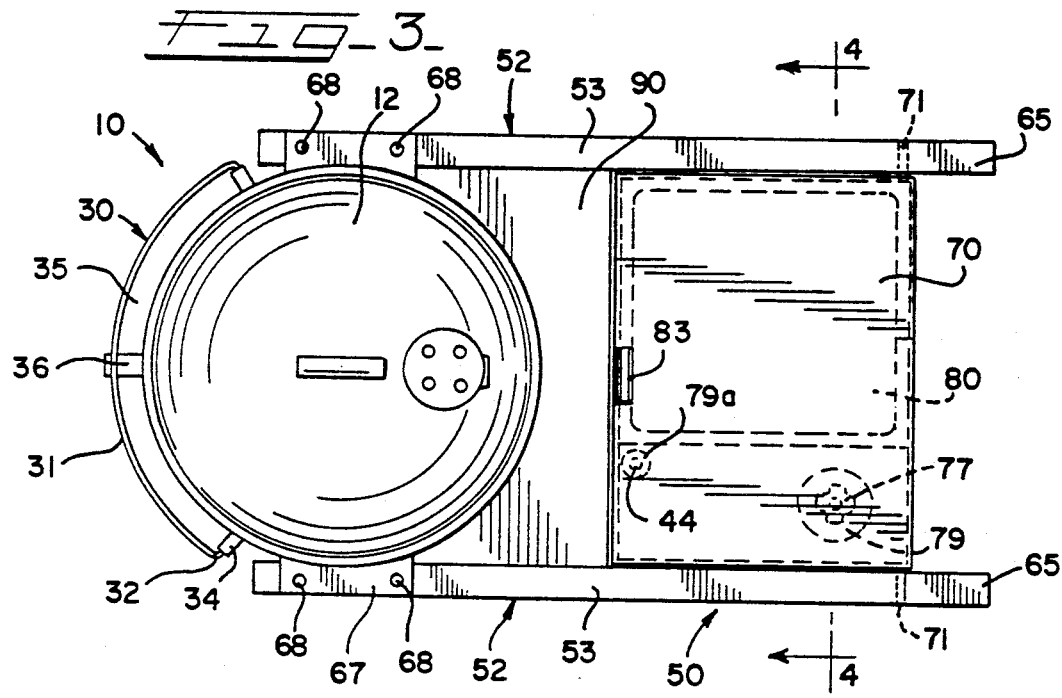
FIG. 3 is a top plan view of the portable grill assembly of FIGS. 1 and 2 wherein the cover for the storage bin is in the closed position.
Figure 4:
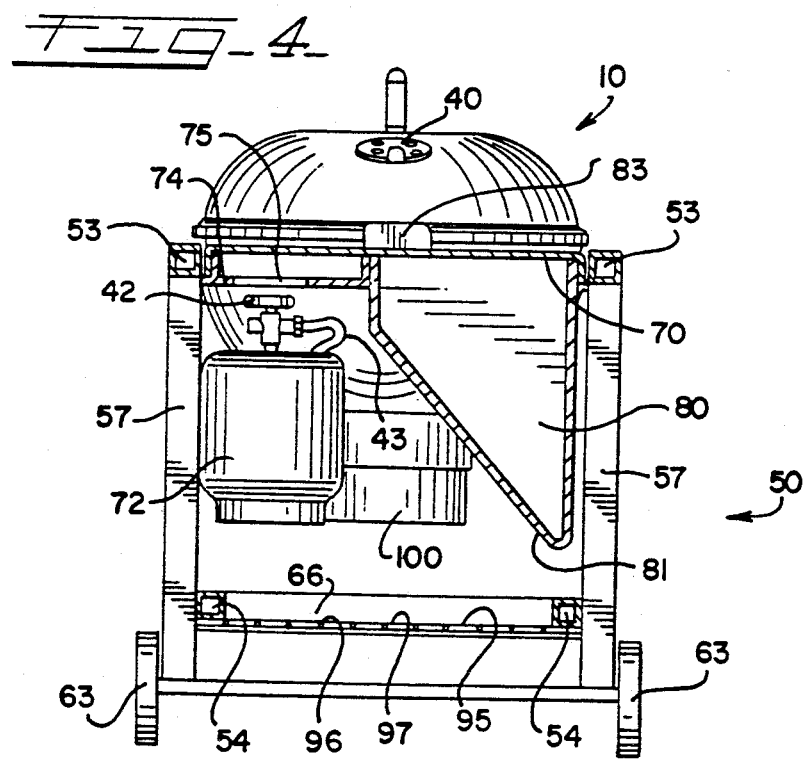
FIG. 4 is a cross-sectional view of the portable grill assembly of FIG. 3 along line 4—4.

As shown generally in the figures, the kettle 10 also includes a cover holder 30 which is attached to the exterior of the bottom 11 to hold the cover 12 while the kettle is opened. This cover holder 30 is generally made in accordance with the one taught in U.S. Pat. No. 4,777,927, which is also incorporated herein by reference. Specifically, the cover holder 30 includes a generally circular rod 31 having opposite end portions 32 extending at right angles from the arcuate center portion. The end portions 32 have a flattened portion that acts as an abutment extending through openings in the bowl, being secured thereto by nuts (not shown) received on the threaded portions of ends 32. A pair of nonmetallic nylon rollers 34 are rotatably supported on the bent end portions 32. The arcuate circular rod 31 thus defines a generally arcuate slot 35 (FIG. 3) adjacent the upper peripheral edge of the bowl and is configured to receive the cover 12.

The cover holder 30 also includes an elongated strap 36 connected at one end to the rod 31 at the center thereof, and connected at the other end to the bowl 11 by a bolt (not shown).

A shutter-type damper 40 is rotatably secured to the cover 12 and employed to control the air flow through openings (not shown) in the cover, which is conventional in present commercial grills. A support grid (not shown) is placed within the kettle and spaced a short distance above the bottom of the bowl to hold the solid fuel (such as charcoal briquettes), which are burned in the barbecuing procedure. Spaced above the support grid and below the bowl's upper lip there is a cooking grid (not shown) on which to place the food being cooked.

An ash catcher 100 can be attached to the bottom 11 of the kettle 10. The ash catcher 100 is constructed in accordance with the teachings of a co-pending application, Ser. No. 571,736 filed Aug. 23, 1990. Also, an ash disposal damper system (not shown) can be installed in the bottom 11 of the kettle 10. A very successful damper system incorporated herein by reference is disclosed in U.S. Pat. No. 4,416,248, which is also owned and marketed by the Assignee of the present invention.

As shown in FIG. 1, the semi-hemispherical kettle bottom 11 is supported on a cart, generally designated with the reference numeral 50. The cart 50 includes a frame structure with a bin cover 70 that can act as a working surface, a storage bin 80 for placing contents in, means for supporting a fuel tank 86,87,88 and a storage shelf 95 for putting miscellaneous items on. An additional working surface 90 can be located between the kettle's bowl 11 and the removable tray structure 70.

The structure supporting the kettle 10 is a frame, generally made of rectangular metal tubing, that includes two identical and parallel side support structures 52 that are connected to each other near their bottoms by two generally parallel lower transverse cross-members 66. The two support structures 52 are also connected at their tops by two generally parallel upper transverse cross-members 66a (FIG. 5). Each side support 52 is composed of a horizontal upper side member 53 and a pair of substantially parallel vertical posts 56,57. The front vertical post 57 is connected to the upper side member 53 adjacent the member's front end. A wheel 63 is attached at the bottom of the front vertical post 57. Similarly, the end of rear vertical post 56 is connected to the upper side member 53 near the member's rear end. A caster 64 is attached at the bottom of the rear vertical post 56.

Two parallel, horizontal lower transverse cross-members 66 connect the corresponding vertical posts 56,57 of each side support structure 52 together. One lower transverse cross-member 66 connects the front posts 57 together, and the other transverse cross-member 66 connects the rear posts 56 together. As shown in the figures these connections are near the bottom of the vertical posts 56,57. Additionally, a pair of substantially horizontal lower side members 54 are preferably connected to and between the two cross-members 66.

The two upper transverse crossmembers 66a are connected at each end to an upper side member 53 rearwardly of the kettle 10. These upper cross-members 66a are used to add internal strength to the cart 50 and to support the storage bins 80,80a and controls.

The cart assembly is sized so that it is at a height for an individual working on the bin cover 70, which is also a work surface, or cooking on the cooking grid inside the kettle 10 can do so comfortably while standing up. Specifically, while standing, an individual has easy access to all of the parts of the kettle 10 and the cart 50. Bending over, one can access the ash catcher 100, ash damper system and the storage rack 95.

As to the connections, they are preferably made such that the posts and members are flush so that no sharp points or projections are exposed which could hurt a person or mar a surface. However, in the preferred embodiment the rear vertical post 56 and the upper transverse cross-member 66a are connected to the upper side member 53 near the end of the upper side member 53 so as to make a T-intersections, forming an extension 65 of the upper side member 53 rearwardly of these connections. This extension 65 can be used as a gripping handle for pushing or otherwise maneuvering the cart 50.

Towards the front end of the cart 50, the semi-hemispherical bottom bowl 11 of the kettle 10 is connected to the two side supports 52 by side brackets 67. Each side bracket 67 has two legs and is generally L-shaped, with one leg fastened to each horizontal upper side member 53 by fasteners 68 and, with the other leg fastened (not shown) to the bottom bowl 11 of the kettle 10. As shown in the figures, specifically FIGS. 1 and 3, the side brackets 67 are generally arcuate so as to follow the generally circular external contour of the bowl 11 and attach to the bowl 11 at diametrically-opposed points on the bowl 11 adjacent the lip.

Towards the rear of the cart 50, there is a bin cover 70 with a handle 83 that is disposed between the side supports 52. At one end of the cover 70, the end closest to the kettle 10, there is a handle 83 projecting upwardly. At this end, the cover 70 rests on a ledge portion 66b of one of the upper transverse cross-members 66a. At the other end of the cover 70, there are means for hingedly attaching the tray to the upper support members 53. In particular, two projections 71 are constructed on the sides of the cover 70 for cooperating with corresponding apertures in the sides of the upper support members 53. Accordingly, when the pins 71 are inserted into the apertures, the cover 70 is rotatable between an open position (shown in phantom lines in FIG. 2) and a closed position. In practice, the pins 71 are formed by a single rod that is bent and fitted through apertures in the sides of the cover 70, projecting outwardly therefrom. For both convenience and safety, the cover 70 swings open away from the kettle 10.

As shown in FIG. 5, a storage bin 80 is positioned below the cover 70 and is disposed between the side supports 52 and between the upper transverse cross-members 66a. This storage bin 80 has lips extending outwardly from its upper edge that are connected to or are rested upon the upper transverse cross-members 66a by conventional means known in the art. The storage bin 80 has side walls and end walls and is closed on the bottom. As shown specifically in FIG. 1, the bin 80 preferably has a steeply inclined bottom.

It has been found that having this inclined bottom surface in the storage bin 80 aids in storing, obtaining and working with items, such as bags of charcoal. For example, a bag of charcoal is easier to store on such an incline in that it is less likely to spill and scatter briquettes all over the bin. Moreover, this inclined bottom aids the cook in removing the charcoal briquettes. The cook need not have to pick up the bag and to remove its contents; rather, the cook can just remove the briquettes directly from the resting bag up. Further, the incline bottom makes portions of items more visible to an individual standing next to the cart 50. By way of illustration, if a barbecue utensil is placed into the bin 80 for safe storage, an individual might have to bend over the cart 50 and the bin 80 to peer inside to find the utensil. However, with the inclined design, a portion of the utensil would be visible without the necessity of bending and peering. This makes for safer cooking if, for example, the conditions around the kettle are smoky or the heat emanating from the kettle great. Finally, an inclined bin bottom aids in draining the storage bin 80 should liquid, such as rain water, enter the bin 80. A hole can be located in bottom 81 at the deepest point to facilitate the flow of the liquid therefrom.

Figure 2:
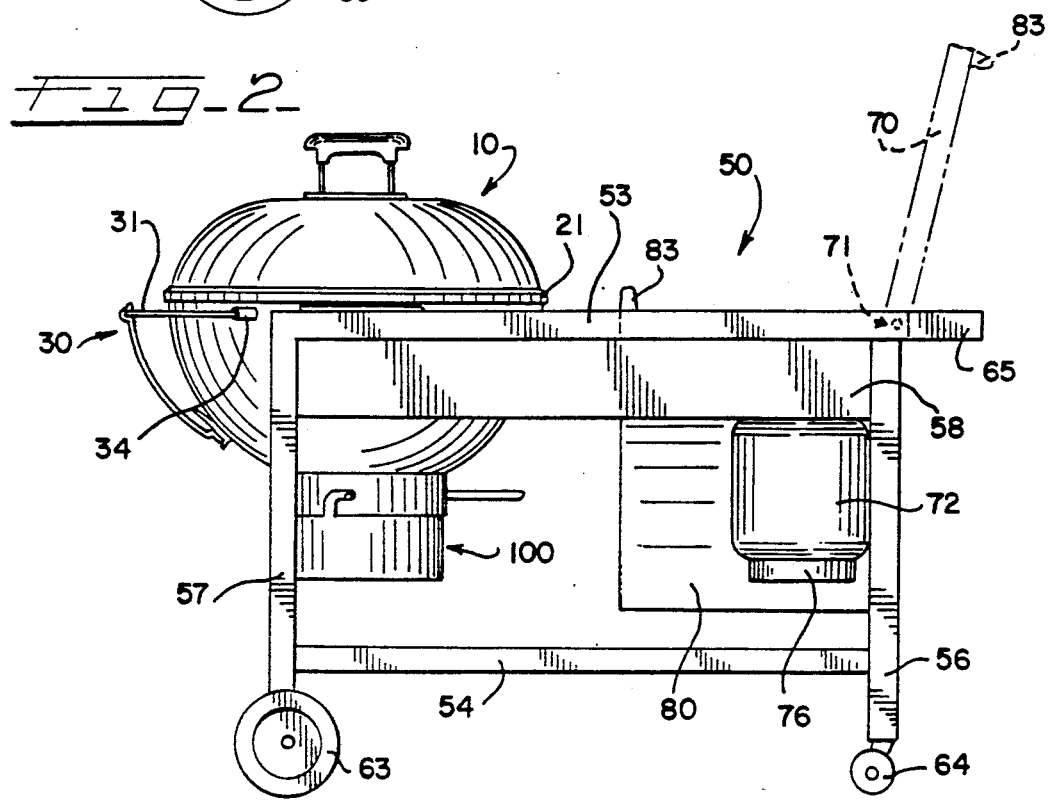
FIG. 2 is a side elevational view of the portable grill assembly of FIG. 1.

As noted previously the top of the bin cover 80 is coated so as to usable as a working surface when it is closed. As illustrated in FIG. 2, cover 70 pivots between a closed position wherein it totally covers the bin 80, and an open position wherein it exposes the bin 80 for access therein. Means are provided on this cart 50 for securing a portable fuel tank 72 adjacent the storage bin 80 and below the cover 70. In particular, as shown in detail in FIG. 7, the tank 72 is constructed so as to have a top piece 73 that has a handle 74 thereon and an aperture 75 therein. The base of the tank 72 includes an outwardly projecting ring 76 that can support the tank when the tank is placed on the ground. An end plate 86 is attached to the rear of the cart 50 to hold the tank below the cover 70, above said storage rack 95 and adjacent the storage bin 80. This end plate 86 is interconnected at the top 86a to an upper transverse cross-member 66a and at the bottom 86b to a lower transverse cross-member 66. Preferably the top 86a of the end piece 86 has two fingers that fit into two slots formed in the upper cross-member 66a. Also, the bottom 86b of the end piece 86 has an extension with an aperture for fastening to the lower cross-member 66.

A pair of hook brackets 87,88 are secured to the end piece 86. The upper hook 87 fits into the aperture 75 in the tank top 73 and the bottom hook 88 cooperates with the projecting ring 76 to hold the tank 72. Thus, the tank can easily lifted and lowered onto the hooks 87,88 and removed for refilling, cleaning or storage.

This arrangement with the tank 72 permits one easy access to the control valve 77 situated at the top of the fuel tank 72. In particular, a face plate 74 (FIG. 5) is attached to the upper transverse cross-members 66a and adjacent the bin 80. An aperture 79 is provided in this face plate 78 to provide the necessary access to and expose the tank valve 77. Accordingly, one can, while standing upright and while cooking, open the bin cover 70 and reach down to turn the valve 77 to turn the fuel in the tank 72 on and off.

A fuel line 43 extends from the tank valve 77 through an opening (not shown) in the bottom bowl 11 of the kettle into the kettle below the solid fuel, i.e., briquettes, resting on the support grid positioned under the cooking grid. Further, a electronic ignitor with a timer and burner tube can be connected to the end of the fuel line 43 opposite the end with the valve 77 for igniting the solid fuel in the kettle 10. One such electronic ignitor is shown in a copending application, U.S. Patent Application No. 566,802, filed Aug. 10, 1990 and assigned to WEBER-STEPHEN PRODUCTS CO.

For convenience, an additional aperture 79a can be placed either in the face plate 78, forwardly of the valve aperture 79, or in the ledge of the forward upper cross-member 66a, as shown in the figures, so as to permit access to a switch or actuating button 44 for the electronic ignitor.

While assembly so far has discussed has included a fuel tank 72 and ignitor system, a second embodiment has been developed that does not include such components. Specifically, as shown in FIG. 6, a second embodiment includes a second storage bin 80a adjacent the first storage bin 80 and secured to and between the two upper transverse cross-members 66a. As with the first bin 80, the second bin 80a includes a lip along its upper side edges so that fasteners can be used to connect it to or it can rest upon the cross members 66a.

Preferably, this second bin 80a is shallow so that it can be used to conveniently house utensils used for cooking.

For added safety, a guard 58 is attached to the cart 50 below the upper side support 53 adjacent the fuel tank 72 and ignition system so as to prevent items and limbs from inadvertently and unintentionally contacting these components. Such a guard 58 can be attached to the upper side support member 53 and/or to the front and rear vertical posts 56,57. In the same manner, similar guards can be secured to the other side of the cart 50 and to the rear of the cart.

Disposed between the cover 70 and the bottom of the kettle 11 is an additional working surface 90 fastened at each side to an upper side member 53. Additional items can be placed on this additional working surface 90. The surface 90 is slid under the kettle's bottom bowl's lip and secured between the upper support members 53.

For additional storage space, the cart 50 of the present invention includes a storage shelf 95. This storage shelf is preferably composed of a plurality of substantially parallel, horizontal rods 96 and a plurality of substantially plurality of substantially cross rods 97. The rods 96,97 can be connected or attached to either the two lower side support members 54 or the two traverse cross-members 66 or to both. In the alternative, instead of forming the shelf 95 of rod members 96,97, it can be formed of slats fastened to the horizontal lower side members 54.

While the specific embodiments have been illustrated and described, numerous modifications come to mind without significantly departing from the spirit of the invention and the scope of protection is only limited by the scope of the accompanying claims.

We claim:

1. A portable barbecue grill assembly comprising:
   a barbecue kettle having a generally semi-hemispherical bottom bowl and a generally semi-hemispherical removable kettle cover;
   a storage bin with a bin cover;
   a fuel tank;
   a kettle support structure for supporting said bottom bowl at a working and an accessible height adjacent one end, and supporting said storage bin and said bin cover and said fuel tank at a working and an accessible height adjacent the other end,
   said kettle support structure including two parallel side support structures, each side support structure including a horizontal upper side member and a pair of vertical posts, said side support structures being connected to each other near their bottoms by a pair of lower transverse cross-members;
   a pair of lower horizontal side support members connected at each end to one said lower transverse cross-member;
   a storage rack positioned between said lower transverse cross-members and below said storage bin;
   a side bracket fastened to each said horizontal upper side member and to a side of the kettle that is disposed between said horizontal upper side members; and,
   fuel tank support means for holding said fuel tank below said cover, above said storage rack and adjacent said storage bin,
   said bin cover being disposed above said storage bin and being hingedly connected between said horizontal upper side support members so as to be movable between an open position to access said storage bin and a closed position to cover said storage bin.

2. The grill assembly as defined in claim 1, further including an ash catcher is secured to said bottom bowl.

3. The grill assembly as defined in claim 2, further including means attached to said bottom bowl for supporting said kettle cover when said kettle cover has been removed from covering said bottom bowl.

4. The grill assembly as defined in claim 3, further including a gas ignitor secured to said bottom bowl for igniting the fuel flowing from said fuel tank into said bowl.

5. The grill assembly as defined in claim 1 wherein said support structure further includes a work surface adjacent said bottom bowl and between said upper horizontal upper side members.

6. The grill assembly as defined in claim 1 further including two substantially parallel upper transverse cross-members interconnected at each end to an upper side support member.

7. The grill assembly as defined in claim 6 wherein said fuel tank support means for holding said fuel tank below said cover, above said storage rack and adjacent said storage bin is a pair of hooks cooperating with said tank attached to a plate disposed between one said upper transverse cross-member and one said lower transverse cross-member.

8. A portable barbecue grill assembly comprising:
   a barbecue kettle having a generally semi-hemispherical bottom bowl and a generally semi-hemispherical removable kettle cover;
   an ash catcher secured to said bottom bowl;
   a storage bin with a bin cover;
   means attached to said bottom bowl for supporting said kettle cover when said kettle cover has been removed from covering said bottom bowl;
   a fuel tank;
   a gas ignitor secured to said bottom bowl for igniting the fuel flowing from said fuel tank into said bowl;
   a kettle support structure for supporting said bottom bowl at a working and an accessible height adjacent one end, and supporting said storage bin and said bin cover and said fuel tank at a working and an accessible height adjacent the other end,
   said kettle support structure including two parallel side support structures, each side support structure including a horizontal upper side member and a pair of vertical posts, said side support structures being connected to each other near their bottoms by a pair of substantially parallel lower transverse cross-members and adjacent their tops by a pair of substantially parallel upper transverse cross members;
   a pair of lower horizontal side support members connected at each end to one said lower transverse cross-member;
   a storage rack positioned between said lower transverse cross-members and below said storage bin;
   a side bracket fastened to each said horizontal upper side member and to a side of the kettle that is disposed between said horizontal upper side members; and, fuel tank support means for holding said fuel tank below said cover, above said storage rack and adjacent said storage bin, said bin cover being disposed above said storage bin and being hingedly connected between said horizontal upper side support members so as to be movable between an open position to access said storage bin and a closed position to cover said storage bin.

9. The grill assembly as defined in claim 8, wherein said fuel tank support means is a pair of hooks cooperating with said tank attached to a plate disposed between one said upper transverse cross-member and one said lower transverse cross-member.

10. The grill assembly as defined in claim 9, further including a work surface adjacent said bottom bowl and between said upper horizontal upper side members.

11. A portable barbecue grill assembly comprising:
a barbecue kettle having a generally semi-hemispherical bottom bowl and a generally semi-hemispherical removable kettle cover;
an ash catcher secured to said bottom bowl;
a primary storage bin adjacent said bottom bowl;
a secondary storage bin adjacent said primary storage bin;
a bin cover for covering said storage bins;
means attached to said bottom bowl for supporting said kettle cover when said kettle cover has been removed from covering said bottom bowl;
a kettle support structure for supporting said bottom bowl at a working and an accessible height adjacent one end, and supporting said storage bins and said bin cover at a working and an accessible height adjacent the other end,
said kettle support structure including two parallel side support structures, each side support structure including a horizontal upper side member and a pair of vertical posts, said side support structures being connected to each other near their bottoms by a pair of substantially parallel lower transverse cross-members and adjacent their tops by a pair of substantially parallel upper transverse cross members;
a pair of lower horizontal side support members connected at each end to one said transverse cross-member;
a storage rack positioned between said lower transverse cross-members and below said storage bin; and,
a side bracket fastened to each said horizontal upper side member and to a side of the kettle that is disposed between said horizontal upper side members; and,
said bin cover being disposed above said storage bins and being hingedly connected between said horizontal upper side support members so as to be movable between an open position to access said storage bins and a closed position to cover said storage bins.

12. The grill assembly as defined in claim 11, further including a work surface adjacent said bottom bowl and between said upper horizontal upper side members.

13. A cart for holding a separate barbecue kettle comprising:
a kettle support structure for supporting at one end the barbecue kettle at a working and accessible height and at the other end, at least one storage bin with a cover and a fuel tank at a working and an accessible height,
said kettle support structure including two parallel side support structures, each side support structure including a horizontal upper side member and a pair of vertical posts, said side support structures being connected to each other near their bottoms by a pair of substantially parallel lower transverse cross-members; and,
a side bracket fastened to each said horizontal upper side member and to a side of the kettle,
said kettle being disposed between said horizontal upper side members,
said cover being disposed above said storage bin and hingedly connected between said horizontal upper side support members so as to be movable between an open position to access said storage bin and a closed position to cover said storage bin.

14. The cart as defined in claim 13 wherein the cart further includes (a) a pair of lower horizontal side support members connected at each end to one of either said transverse cross-member or said vertical post and (b) a storage rack positioned between said lower transverse cross-members and below said storage bin.

15. The cart as defined in claim 14 wherein the cart further includes fuel tank support means for holding said fuel tank below said cover, above said storage rack and adjacent said storage bin.

16. The cart as defined in claim 15 wherein fuel tank support means is a pair of hooks cooperating with said tank attached to a plate disposed between one said upper transverse cross-member and one said lower transverse cross-member.

17. The cart as defined in claim 16 wherein the cart further includes two substantially parallel upper transverse cross-members interconnected at each end to an upper side support member.

18. The cart as defined in claim 17 wherein the cart further includes a work surface adjacent the kettle and between said horizontal upper side support members.

19. A cart for holding a separate barbecue kettle comprising:
a kettle support structure for supporting at one end the barbecue kettle at a working and accessible height and at the other end, at least one storage bin with a cover and a fuel tank at a working and an accessible height,
said kettle support structure including two parallel side support structures, each side support structure including a horizontal upper side member and a pair of vertical posts, said side support structures being connected to each other near their bottoms by a pair of substantially parallel lower transverse cross-members;
a pair of lower horizontal side support members connected at each end to one of either said transverse cross-member or said vertical post;
a storage rack positioned between said lower transverse cross-members and below said storage bin;
two substantially parallel upper transverse cross-members interconnected at each end to an upper side support member;
a work surface adjacent the kettle and between said horizontal upper side support members;
a side bracket fastened to each said horizontal upper side member and to a side of the kettle, said kettle being disposed between said horizontal upper side members, said cover being disposed above said storage bin and hingedly connected between said horizontal upper side support members so as to be movable between an open position to access said storage bin and a closed position to cover said storage bin; and, fuel tank support means for holding a fuel tank below said cover, above said storage rack and adjacent said storage bin, said tank support means including a pair of hooks cooperating with said tank attached to a plate disposed between one said upper transverse cross-member and one said lower transverse cross-member.

20. A cart for holding a separate barbecue kettle comprising:

a kettle support structure for supporting at one end the barbecue kettle at a working and accessible height and at the other end, a pair of storage bins with a cover for both at a working and an accessible height, said kettle support structure including two parallel side support structures, each side support structure including a horizontal upper side member and a pair of vertical posts, said side support structures being connected to each other near their bottoms by a pair of substantially parallel lower transverse cross-members and at their tops by a pair of substantially parallel upper transverse cross-members;

a pair of lower horizontal side support members connected at each end to one of either said transverse cross-member or said vertical post;

a storage rack positioned between said lower transverse cross-members and below said storage bin;

a work surface adjacent the kettle and between said horizontal upper side support members; and, a side bracket fastened to each said horizontal upper side member and to a side of the kettle, said kettle being disposed between said horizontal upper side members, said cover being disposed above said storage bins and hingedly connected between said horizontal upper side support members so as to be movable between an open position to access said storage bins and a closed position to cover said bins.

* * * * *